United States Patent [19]

Kato et al.

[11] Patent Number: 5,237,860

[45] Date of Patent: Aug. 24, 1993

[54] METHOD FOR MEASURING SURFACE ROUGHNESS OF HONEYCOMB STRUCTURES AND SURFACE ROUGHNESS-MEASURING ELEMENTS USED THEREFOR

[75] Inventors: Hisayoshi Kato, Aichi; Keiji Kawasaki, Nagoya, both of Japan

[73] Assignee: NGK Insulators, Ltd., Japan

[21] Appl. No.: 716,113

[22] Filed: Jun. 17, 1991

[30] Foreign Application Priority Data

Jun. 19, 1990 [JP] Japan .................. 2-158773

[51] Int. Cl.⁵ .............................................. G01B 5/28
[52] U.S. Cl. .................................................. 73/105
[58] Field of Search ........................................ 73/105

[56] References Cited

U.S. PATENT DOCUMENTS

| | | | |
|---|---|---|---|
| 3,087,329 | 4/1963 | Grodek et al. | 73/105 |
| 3,913,393 | 10/1975 | Facy | 73/105 |
| 4,988,887 | 1/1991 | Watanabe et al. | 356/241 X |

FOREIGN PATENT DOCUMENTS

| | | | |
|---|---|---|---|
| 11151 | 6/1956 | Fed. Rep. of Germany | 73/105 |
| 1029575 | 5/1958 | Fed. Rep. of Germany | 73/105 |
| 579442 | 7/1958 | Italy | 73/105 |
| 926528 | 5/1982 | U.S.S.R. | 73/105 |
| 818345 | 8/1959 | United Kingdom | 73/105 |

*Primary Examiner*—Tom Noland
*Attorney, Agent, or Firm*—Parkhurst, Wendel & Rossi

[57] ABSTRACT

A method for measuring surface roughness of an end face of a honeycomb structure having a plurality of cells by using a stylus having a width corresponding to a width of at least two cells. A honeycomb surface roughness-measuring element, which is adapted for the measurement of a surface roughness of an end face of a honeycomb structure, includes a stylus having a tip, said tip having a widened edge with a width of 2 to 8 mm and a radius of curvature of 1 to 5 μm.

2 Claims, 5 Drawing Sheets

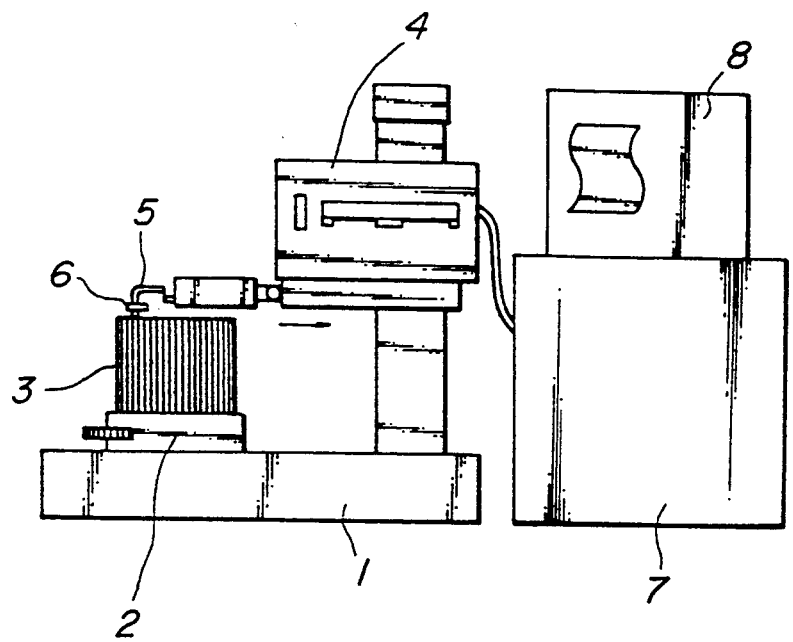
FIG_1

FIG_3a 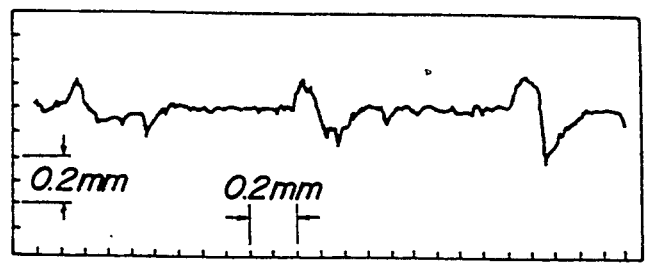
FIG_3b 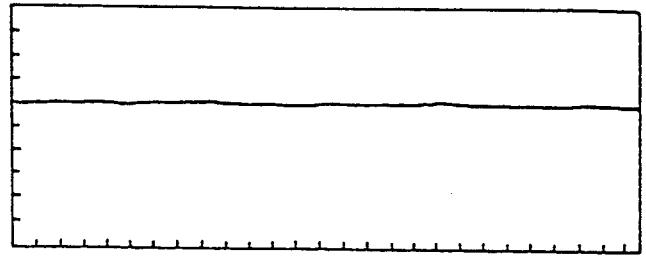
FIG_3c 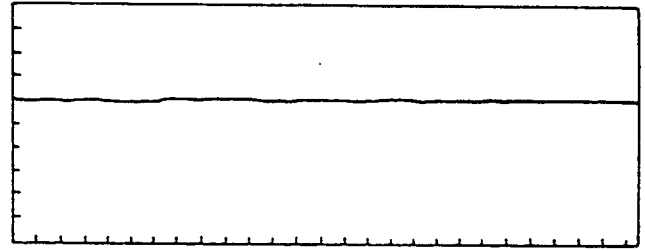
FIG_3d 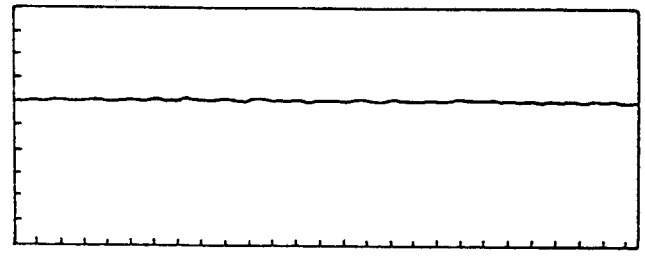
FIG_3e 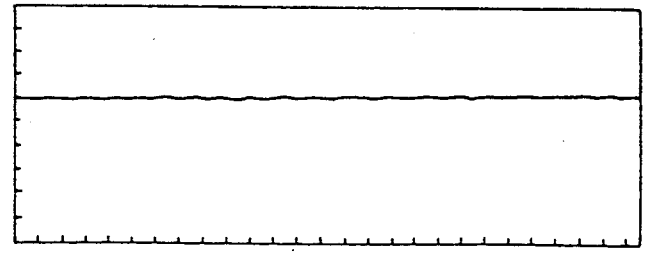

FIG._4
PRIOR ART
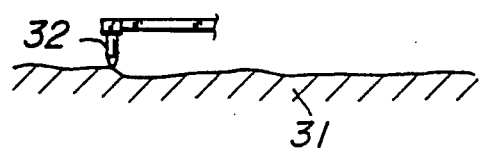
FIG._5a
PRIOR ART
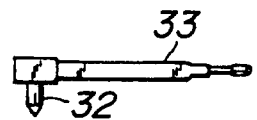
FIG._5b
PRIOR ART
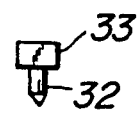
FIG._5c
PRIOR ART
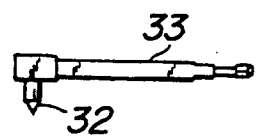
FIG._5d
PRIOR ART
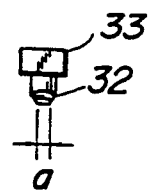

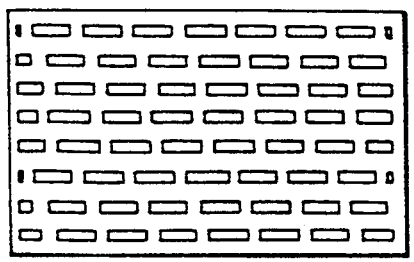
FIG_6a
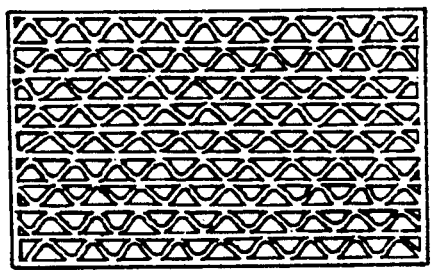
FIG_6b
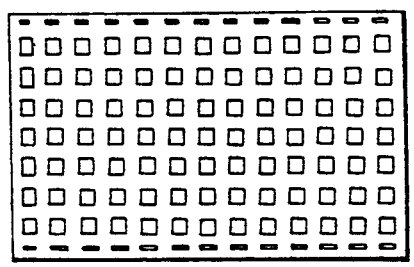
FIG_6c
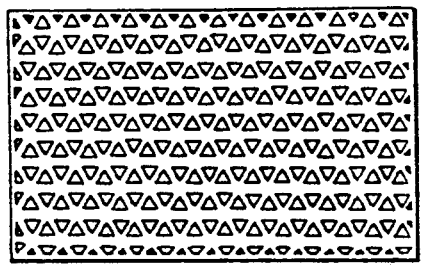
FIG_6d
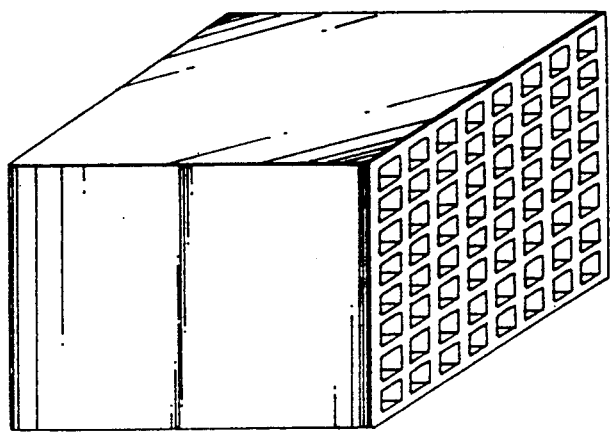
FIG_7

METHOD FOR MEASURING SURFACE ROUGHNESS OF HONEYCOMB STRUCTURES AND SURFACE ROUGHNESS-MEASURING ELEMENTS USED THEREFOR

BACKGROUND OF THE INVENTION (1) Field of the Invention

The present invention relates to a method for measuring the surface roughness of honeycomb structures, particularly, honeycomb structures for use in rotary regenerating type heat exchangers, and to surface roughness-measuring elements to be used therefor.

(2) Related Art Statement

Since honeycomb structures are used as catalyst carriers or the like in the state that they are fixedly assembled to catalyst units or the like, cut end faces of honeycomb structures used are left as they are cut.

On the other hand, since honeycomb structures recently have been used as regenerators for rotary regenerating type heat exchangers, it is necessary that an end face including a plurality of cut cells of the honeycomb structure sealingly contacts a sealant under rotation. Therefore, it is important to control the surface roughness of the end face of the honeycomb which includes a plurality of the cells.

Heretofore, the surface roughness has been measured by means of a surface roughness measuring device using a given stylus. That is, as shown by way of a measuring example in FIG. 4, unevenness of an object 31 to be measured is detected by bringing a given stylus 32 into contact with a surface of the object 31, and moving the stylus 32 along the surface of the object, while maintaining contact. FIGS. 5(a) and (b) show front and side views of a standard stylus, respectively, and FIGS. 5(c) and (d) show front and side views of a knife edge type stylus, respectively: As is seen in there figures, the stylus 32 having a substantially conical tip shape is connected to a tip of a measuring element body 33.

Although these styli 32 can be used with a steel plate or sheet, use with end faces of the above-mentioned honeycomb structures causes problems.

That is, when the above stylus 32 is traced on end walls of cells at the end face of the honeycomb structure having a cell wall thickness of about 0.1 mm, the stylus 32 falls in a through channel from the cell wall to make measurement impossible. Even if the end face of the honeycomb structure can be traced by the stylus, variations in the measured roughness of the end faces of the cell walls are so great as to make the accurate measuring impossible.

On the other hand, the roughness of the entire sliding surface, that is, the smoothness of the entire end face including a plurality of the cells, is more important rather than the roughness of each cell wall.

SUMMARY OF THE INVENTION

It is an object of the present invention to solve the above-mentioned problems, and to provide a method and a surface roughness-measuring element for measuring the surface roughness of the honeycomb structures, which can reduce variations in measured values, and allow easy surface roughness measurement of the entire end face of the honeycomb structure.

The present invention relates to a method for measuring the surface roughness of an end face of the honeycomb structure including a plurality of cells, wherein the surface roughness is measured by using a stylus having a width as wide as at least two cells.

The present invention also relates to the surface roughness-measuring element in which a tip of a stylus of the measuring element possesses a wide edge shape having a width of 2 to 8 mm and a radius of curvature of 1 to 5 $\mu$m.

The term "honeycomb structure" used herein means structural bodies in which honeycomb-like thin channels are defined by numerous thin walls. The cells and the thin walls are called channels and cell walls respectively. As shown in FIGS. 6 (a) through (d), the cells may have a rectangular section, a corrugated section, a square section, a triangular section or the like. FIG. 7 illustrates an example of the honeycomb structures. The cells may be formed by calendering, corrugating (coated paper wrapping), extruding, or the like.

By employing the above construction, according to the present invention, rather than the surface roughness of the end face of each of the cells, the surface roughness of the entire end face of the honeycomb structure can be measured. This object is carried out by using a wide stylus having a width corresponding to at least two cells. Consequently, the roughness of the end face of the honeycomb structure can be favorably measured without variations.

The width of the edge of the stylus is preferably twice to four times as great as the width of the opening of the cell of the honeycomb structure, depending upon the size of the opening of the cell.

Since the typical size of each of the cells of the rotary regenerating type heat exchanger is about 0.5 mm to about 2 mm, the width of the wide portion of the stylus needs to be about 2 to about 8 mm. Further, it is necessary that the radius of curvature of the edge portion of the tip of the stylus is in range of 1 to 5 $\mu$m.

These and other objects, features and advantages of the invention will be appreciated upon reading of the following description of the invention when taken in conjunction with the attached drawings, with the understanding that some modifications, variations and changes of the same could be made by the skilled in the art to which the invention pertains, without departing from the spirit of the invention or the scope of claims appended hereto.

BRIEF DESCRIPTION OF THE INVENTION

For a better understanding of the invention, reference is made to the attached drawings, wherein:

FIG. 1 is a schematic view of the construction of an apparatus for performing the measuring method according to the present invention;

FIGS. 2 (a) through (c) are front, side and perspective views of a construction example of the styli to be used for the measuring method according to the present invention:

FIGS. 3 (a) through (e) are measurement charts of roughness by the method of the present invention and a conventional method;

FIG. 4 is a view illustrating an example of the measuring way of the surface roughness by the conventional method;

FIGS. 5 (a) and (b), (c) and (d) are front and side views of two conventional styluses, respectively;

FIGS. 6 (a) through (d) are views of illustrating the shapes of the cells of the honeycomb structures; and FIG. 7 is a perspective view of the honeycomb structure.

DETAILED DESCRIPTION OF THE INVENTION

Figure 2A:
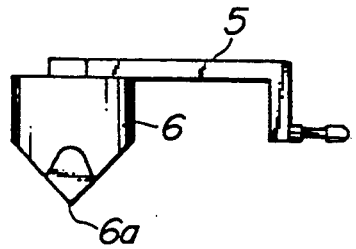

FIG. 1 is a schematic view of one embodiment of the apparatus for performing the honeycomb surface roughness-measuring method according to the present invention. In the apparatus of FIG. 1, reference numerals 1, 2 and 3 denote a base, an inclination degree-adjusting table provided o the base 1 and adapted to receive an object to be measured, and a honeycomb structure placed on the inclination degree-adjusting table 2, respectively. A driving unit 4 is vertically movably held by a pole erected on the base 1, and a measuring element 5 is attached to the driving unit 4 such that the element 5 may be moved along a direction indicated by the arrow. A stylus 6 is attached to a tip of the measuring element 5, and an arithmetic controller 7 controls the driving unit 4, and processes measurement results detected by the stylus 6. A recorder 8 records and outputs arithmetic results obtained by the arithmetic controller 7.

The surface roughness of the honeycomb structure is actually measured by means of the above-mentioned apparatus as follows:

First, the honeycomb structure 3 is placed on the inclination degree-adjusting table 4 in the state that that cut face of the honeycomb structure which is to be measured is faced upwardly. After this cut end face of the honeycomb structure 3 is made parallel to the moving direction of the measuring element 5 by means of the inclination degree-adjusting table 4, the stylus 6 having a given tip structure is set onto that end face of the honeycomb structure which is to be measured. Then, roughness of the end face is measured by the measuring element 5 through tracing the stylus 6 along the surface of the end face of the honeycomb structure by actuating the driving unit 4. Measured displacement values are inputted into the arithmetic controller 7 where the fed displacement values are processed. Then, the processed values are recorded in the recorder 8 to complete the measurement of the surface roughness.

Figure 2B:
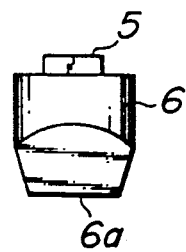
Figure 2C:
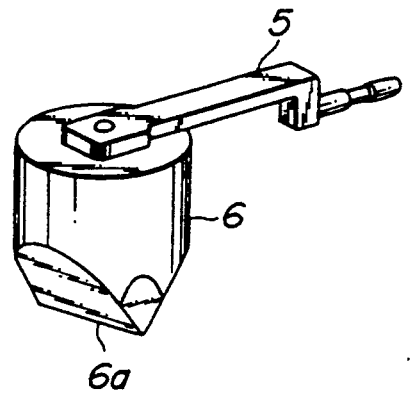

FIGS. 2 (a) through (c) are the front, side and perspective views of a structural example of the stylus 6 to be used in the present invention, respectively. Different from the conventional styli, the stylus 6 shown in FIGS. 2 (a) through (c) has a construction that a tip portion 6a to contact the end face of the honeycomb structure has a given widened shape. The width of the tip portion 6a is, for example, about 5 mm, and the width of the tip portion needs to have a width at least twice as great as that of the cell at the end face of the honeycomb structure. When in use, it is necessary to set the measuring element such that a widened portion of the tip portion of the measuring element may extend in a direction orthogonal to the tracing direction of the stylus.

In the following, actual measuring examples will be explained.

EXAMPLES

A block of a cordierite honeycomb structure having cells of a rectangular section (aspect ratio=1:1.9) at a cell density of 190 cells/cm were prepared in a size of 50×50×50 mm. A honeycomb end face of the honeycomb block was polished by a grinding stone having a roughness of #400.

Next, the thus prepared honeycomb structure was set to a surface roughness measurement. As a stylus, a special stylus having a tip portion with a width of 5 mm and a radius of curvature of 3 $\mu$m was fitted to a measuring element of the surface roughness measurement. The measuring conditions of the surface roughness-measuring apparatus were adjusted to a vertical magnification of 500 times, a measuring length of 2.5 mm, a cut-off value of 0.8 mm, and a measuring speed of 0.1 mm. The measurement was effected under the above measuring conditions, and measuring results were outputted to a pen recorder. Then, the maximum surface roughness (Rmax) was calculated by using the arithmetic unit 7. A surface roughness specimen (1.6 s=Rmax 1.6 $\mu$m) was set on the honeycomb structure, the surface roughness of this specimen was measured under the same conditions, and measurement results were outputted to the pen recorder. Thereafter, the stylus was exchanged with a commercially available standard stylus (radius of curvature at tip: 3 $\mu$m) or a knife edge type stylus, and then the surface roughness was measured by the same method.

Measurement results (Rmax) obtained by the above measurements are shown in Table 1, and charts of surface roughness are shown in FIGS. 3(a) through (e).

TABLE 1

| | | Honeycomb | | | Surface roughness specimen (1.6S) | | |
|---|---|---|---|---|---|---|---|
| | | Measurement result of Surface roughness ($\mu$m) | Chart | Surface roughness waveform | Measurement result of Surface roughness ($\mu$m) | Chart | Surface roughness waveform |
| Comparative Example | Stylus A (standard type) | measurement impossible | — | — | 1.5 | FIG. 3(c) | no problem |
| | Stylus B (knife edge type) | abnormal measurement data | FIG. 3(a) | irregular waveform | 1.8 | FIG. 3(d) | no problem |
| Example | Invention stylus | 1.4 ($\sigma$ = 0.1) | FIG. 3(b) | no problem | 1.5 | FIG. 3(e) | no problem |

As is seen from the results in Table 1 and FIGS. 3(a) through (e), each of the styli exhibited a value of 1.5 to 1.8 s for a specified value 1.6 s of the surface roughness specimen, and these styli caused no problem in accuracy. However, with respect to the end face of the honeycomb structure, the special stylus having a wide width according to the prevention repeatedly afforded measurement values considered reasonable, whereas the knife edge type stylus caused considerably great variations in the measurement results, which is considered to pose a problem with respect to the measured values. The standard stylus fell in the through channel during the measurement, so that the surface roughness could not be measured.

As mentioned above, according to the measuring method and the surface roughness-measuring element used therefor in the present invention, since the end faces of at least two cell walls were simultaneously traced by the stylus having a specific shape, the surface roughness of the end face of the honeycomb structure having a plurality of the cell walls can be favorably measured. Further, the surface roughness of the honeycomb structure, particularly one to be used as a regenerator for the rotary regenerating type heat exchanger can be favorably controlled.

What is claimed is:

1. A method for measuring surface roughness of an end face of a honeycomb structure, wherein a plurality of cells terminate at said end face, comprising the step of:

passing a stylus along the end face of the honeycomb structure, said stylus having a linear contacting edge for direct contact with the end face, said linear contacting edge having a length corresponding to the width of at least two cells.

2. The method of claim 1, wherein said honeycomb structure is a rotary regenerating type heat exchanger.

* * * * *